(No Model.) 2 Sheets—Sheet 1.

A. SNYDER.
CYLINDER FOR AIR AND GAS COMPRESSORS.

No. 351,665. Patented Oct. 26, 1886.

Witnesses
A. A. Connolly
W. E. Stearns

Inventor
August Snyder
by Connolly Bros
Attorneys (No Model.) 2 Sheets—Sheet 2.

A. SNYDER.
CYLINDER FOR AIR AND GAS COMPRESSORS.

No. 351,665. Patented Oct. 26, 1886.

Witnesses
N. A. Connolly
W. E. Stearns

Inventor
August Snyder
by Connolly Bros.
Attorneys

UNITED STATES PATENT OFFICE.

AUGUST SNYDER, OF ALLEGHENY, PENNSYLVANIA.

CYLINDER FOR AIR AND GAS COMPRESSORS.

SPECIFICATION forming part of Letters Patent No. 351,665, dated October 26, 1886.

Original application filed April 27, 1885, Serial No. 163,645. Divided and this application filed August 28, 1885. Serial No. 175,574.

(No model.)

*To all whom it may concern:*

Be it known that I, AUGUST SNYDER, a citizen of the United States, residing at Allegheny, in the county of Allegheny and State of Pennsylvania, have invented certain new and useful Improvements in Cylinders for Air or Gas Compressors; and I do hereby declare the following to be a full, clear, and exact description of the invention, such as will enable others skilled in the art to which it appertains to make and use the same.

My invention has relation to air and gas compressors, and relates more particularly to that class of compressors used in refrigerating or ice-making machines—such, for instance, as that shown and described in my application for Letters Patent of the United States filed April 27, 1885, Serial No. 163,645, of which the present application is a division.

My invention has for its object the provision of a novel and efficient form of cylinder and its appurtenant parts, the piston, the piston-packing, the ingress and egress openings for the gas or air, the valves applied thereto, &c.

My invention consists in the novel construction, arrangement, and combination of parts, as hereinafter fully described and specifically claimed.

Figure 1:
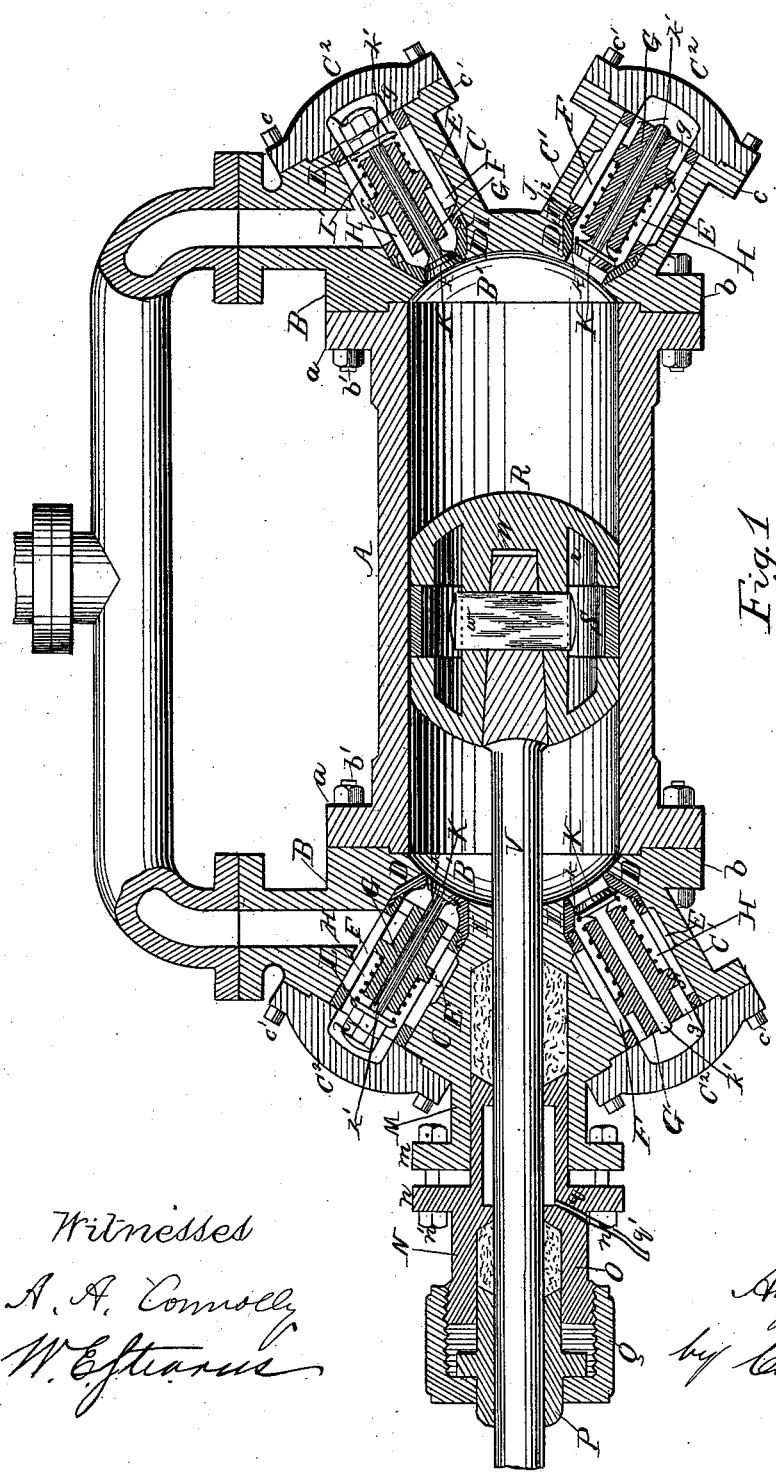
Figure 2:
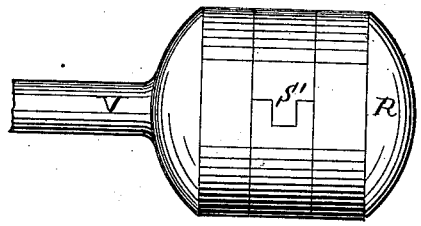
Figure 3:
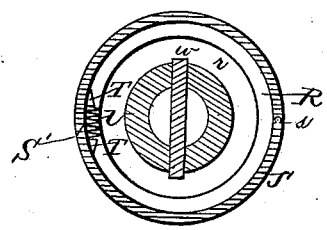

Referring to the accompanying drawings, which illustrate my invention, Figure 1 is a longitudinal vertical section of the cylinder complete, with the piston-rod and the pipes leading thereto broken off. Fig. 2 is a side view, and Fig. 3 a cross-section, of the piston; and Fig. 4, a plan view of one of the cages in which the valves are seated.

A designates the cylinder, which is of the usual form, and is provided with flanges $a\ a$ at each end for the attachment of the heads. The heads, which are lettered B B, are formed with interior concave surfaces, $B'\ B'$, whose diameter corresponds with the interior diameter of the cylinder. The heads B B are provided with flanges $b\ b$, corresponding to the flanges $a\ a$ of the cylinder A, and are secured to the cylinder by means of bolts $b'\ b'$, passing through the flanges $a\ a$ and $b\ b$. Each of the heads B B is provided with a valve-pocket, C, for the reception of the ingress-valve, and a similar pocket, C', for the reception of an egress-valve. The valve-pockets are arranged, as shown, at an angle to the longitudinal axis of the cylinder A, and are provided at their outer ends with flanges $c\ c$, to which are secured flanged heads $C^2\ C^2$ by bolts $c'\ c'\ c'$.

The interiors of the valve-pockets C C' are bored out for the reception of the cage in which the valves are supported, the bore being of even diameter throughout the length of the pocket, except at the inner end of the same, where it is contracted, as shown at D. An annular space, E, is formed in the sides of the pocket, and with this space the openings which lead to the pipes leading to and from the cylinder communicate. The pipes and openings communicating with the ingress-valves C C are shown as being broken off a short distance above the cylinder, while the pipes which communicate with the egress-valves are at the back of the figure, behind the pockets, and are not shown.

Figure 4:
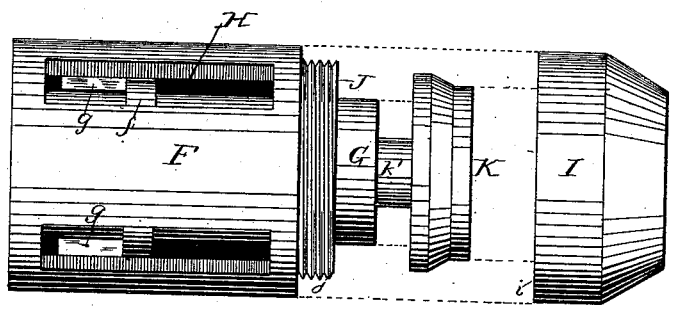

In Fig. 4 I have shown one of the cages in which the valves are supported detached from the cylinder. Said cage consists of two concentric cylindrical bodies, F G, cast integral with the lateral flange $f$, and the vertical wings $g\ g$, leaving an annular space, H, between the parts F G and the dished end piece, I, which is exteriorly shaped to fit the contracted portion D of the valve-pocket, and is formed with an interior screw-thread, $i$, which screws upon a screw-thread, $j$, which is cut upon a flange, J, on the lower end of the exterior shell, F, of the cage. In the egress-valve the interior and in the ingress-valve the exterior of a central opening, $I'$, in the piece I is beveled, as at $k$, to form a seat for the valve, which is accurately fitted thereto.

K designates the valve, and $k'$ the stem of the same, which passes up through an opening in the center of the cage.

In the ingress-valve the stem $k'$ has a nut, $l$, on its end and a plate, L, held in position by said nut, a spiral spring, L', which fits down in the annular space H and rests upon the flange $f$, bearing against the under side of said plate and serving to retain the valve against its seat.

In the egress-valves the spiral spring is set in the lower portion of the annular space H, and bears directly upon the head of the valve, the nut $l$ and plate L being dispensed with.

The cages being of the same length as the pockets into which they are fitted, the outer ends of the same are flush with one another, and the cages are held in position by the heads C² C² of said pockets.

The cages and the valves are fitted into the pockets C C' before finishing the concave surfaces on the interior of the cylinder-heads and the ends of the cages, and the heads of the valves being paired off during the operation of finishing the concave surfaces, it will be observed that these parts partake of the concavity of the cylinder-heads, and hence an absolutely accurate contact of the piston with the heads is rendered possible.

It will be observed that the only portion of the cage which is liable to wear out or to be damaged—i. e., the valve-seat—is made in a separate piece from the rest of the cage, and hence may be easily and readily replaced by removing the cage from the pocket.

At that end of the cylinder A through which the piston-rod passes the head B is formed with a stuffing-box, M, cast integral with the head and the valve-pockets, and provided with a flange, m, at its outer end. A gland, N, having a flange, n, fits into the stuffing-box M, and is secured thereto by bolts n' n', passing through the flanges m and n. The gland N has a hollow bush, O, upon its outside, forming a second stuffing-box, into which fits a second gland, P, that is held in position by a screw-cap, Q, which screws over the end of the bush O, and has a central opening for the passage of the piston-rod. The interior of the gland N is cut out, so as to form an annular oil-chamber around the piston-rod, communication being had therewith through an inclined passage, q, with which the oil-pipe q' communicates.

From the foregoing description it will be observed that there are two complete packings around the piston-rod—that is, one in the rear of each of the glands N O—and that there is between the two packings an annular chamber for the reception of the oil, which is maintained at a pressure therein, as described in my before-mentioned application. The advantage of this arrangement is, that should the packing upon the inside of the oil-chamber become worn the inner gland, N, may be slid out along the piston-rod upon removing the bolts n' n', and the packing replaced without removing the exterior packing, and should the latter become worn it may be replaced by unscrewing the cap Q and sliding the gland O out along the piston-rod, and without disturbing the inner packing.

I will now proceed to describe the construction of the piston and the manner of packing the same and securing it to the piston-rod, and I will call attention to the fact that in order to obtain the best effect in a machine of this class it is necessary to so construct the piston-head that at each stroke the said head may be allowed to come into positive contact with the two heads of the cylinder, for the reason that if any of the compressed gas or air be retained in the cylinder after the piston has completed its stroke in either direction, the said gas or air being then under a very high degree of pressure, the valves will not open for the admission of fresh gas or air until the pressure within the cylinder is reduced by the recession of the piston to a point which will allow the springs L' to force the valves from their seats, whereas if all the air or gas be expelled from the cylinder at each stroke the valves will open the instant the piston leaves the head of the cylinder.

R designates the piston, which consists of a cylindrical body cast in one piece, fitted accurately to the bore of the cylinder, and having its ends rounded to exactly fit the concave interior surfaces of the cylinder-heads. The body of the piston is formed with an annular cavity, r, and the exterior shell is cut through into said cavity at about the middle of the piston, for the reception of a metallic packing-ring, S. This ring, which is of any suitable material, and is made in two sections hinged together at s, has its adjoining ends opposite to the hinge dovetailed together and beveled, as shown at S'. On the interior of the ring, and on each side of the dovetailed joint S', are formed lugs T T, between which is placed a spiral spring, U, which serves to spread the ring out against the sides of the cylinder, and thereby produces a tight fit.

V designates the piston-rod, which fits into a cavity, W, formed in the center of the piston, and is retained therein by a key, w, which passes through a suitable hole in the piston-rod, and is inserted through the slot in which the ring S fits before placing the latter in position.

From the above description it will be noted that the piston is firmly secured to the piston-rod without the use of any exterior fastening whatsoever, and that I am by this construction enabled to fit the piston ends accurately to the concavities of the cylinder-heads.

If the piston were secured in the ordinary manner—that is, if the piston-rod passed therethrough and was secured by means of nuts, or if the piston were built up of separate sections, secured together by bolts and nuts in the ordinary manner—it would be impossible to secure that intimate contact of the piston with the heads of the cylinder which, as before mentioned, is necessary to the production of the best results in a machine of this class.

Having described my invention, I claim—

1. In a compressor, the combination, with the cylinder, of a valve-pocket having a central opening for the reception of a valve-cage, said opening being of even bore from its outer end to a point near its junction with the cylinder, where it is conical, and the said cage being formed to fit in said pocket, its lower end being conical, to correspond with the conical portion of the pocket, substantially as described.

2. In a compressor, the combination, with a cylinder having spherical heads and valve-seats and valves fitted therein and correspondingly concaved on their ends, of a piston-head having spherical ends corresponding in shape to the cylinder-heads, substantially as described.

3. In a compressor, the combination, with the pocket C, the cage composed of the concentric cylindrical portions F G, the flange $f$, and the removable dish-shaped valve-seat I, of the valve K and the spiral spring L', placed in the annular space H, and bearing against the flange $f$, all constructed and arranged substantially as described.

4. In a compressor, the combination, with the cylinder and the piston-rod, of the piston R, having a smooth forward end, a central piston-rod cavity opening to the rear only, and a wedge or key passing through said piston-rod, substantially as described.

In testimony whereof I have affixed my signature in presence of two witnesses.

AUGUST SNYDER.

Witnesses:
 JOS. B. CONNOLLY,
 JOHN F. ATCHESON.